US005939981A

United States Patent [19]

Renney

[11] Patent Number: 5,939,981

[45] Date of Patent: Aug. 17, 1999

[54] ITEM LOCATOR WITH ATTACHABLE RECEIVER/TRANSMITTER

[76] Inventor: Marjorie Renney, 37315 Chestnut Ridge Rd., Elyria, Ohio 44035

[21] Appl. No.: 09/014,927

[22] Filed: Jan. 28, 1998

[51] Int. Cl.$^6$ ................................ G08B 1/08; H04Q 7/00

[52] U.S. Cl. ............... 340/539; 340/825.36; 340/825.49; 340/407.1; 340/691.6; 340/692; 340/686.6

[58] Field of Search ..................................... 340/539, 531, 340/825.49, 825.36, 825.54, 407.1, 691.6, 692, 693.5, 686.6

[56] References Cited

U.S. PATENT DOCUMENTS

| | | | |
|---|---|---|---|
| 4,476,469 | 10/1984 | Lander | 340/539 |
| 4,507,653 | 3/1985 | Bayer | 340/539 |
| 4,989,241 | 1/1991 | Chen | 379/357 |
| 5,289,163 | 2/1994 | Perez et al. | 340/539 |
| 5,294,915 | 3/1994 | Owen | 340/539 |
| 5,337,041 | 8/1994 | Friedman | 340/573 |
| 5,455,560 | 10/1995 | Owen | 340/539 |
| 5,508,694 | 4/1996 | Treharne et al. | 340/426 |
| 5,598,143 | 1/1997 | Wentz | 340/539 |
| 5,638,050 | 6/1997 | Sacca et al. | 340/539 |

*Primary Examiner*—Donnie L. Crosland

[57] ABSTRACT

A device which functions to locate preselected items which are remote from a user. The device comprises two parts; a hand held device and multiple sensors/chips which are applied to objects the user desires to locate. The hand held devices contains a control panel selector buttons for each multiple sensors/chip it is desired to locate. When a preselected button is depressed, a transmitter sends signal containing preselected code. The signal is received by a receiver in each multiple sensors/chip. The receiver in each multiple sensors/chip reads the code and if a match is obtained the receiver enables an audio tone generator in the multiple sensors/chip to send a tone through an audio speaker. The multiple sensors/chip further, transmits a signal to the hand held device which is received by a second receiver and decoded. The second receiver matches the code with the multiple sensors/chip selected and enables a second audio tone generator to send a second tone through a second speaker. Both tones are controlled to become louder the closer the hand held device is to the desired multiple sensors/chip. The multiple sensors/chip has an attachment device permitting attachment to various articles to be found. The hand held device and multiple sensors/chip are powered by a power source.

7 Claims, 4 Drawing Sheets

ITEM LOCATOR WITH ATTACHABLE RECEIVER/TRANSMITTER

BACKGROUND OF THE INVENTION

1. Field of the Invention

The present invention relates to location of hidden items. More particularly, the present invention relates to location of an item with a remote location device.

2. Description of the Prior Art

Consumer electronic devices such as TVs, VCRs, satellite receivers have optional remote controls which are separate from the major device, and other articles such as keys, glasses, articles of clothing and generally items which are hand carried by a person are prone to misplacement. Often, while not lost, the items are concealed by furniture or other objects, or simply placed in an unusual location where the owner has difficulty in locating them. What is needed is a device which permits the owner to locate the hidden objects.

Numerous innovations for an Item Locator with Attachable Receiver/Transmitter have been provided in the prior art that are described as follows. Even though these innovations may be suitable for the specific individual purposes to which they address, they differ from the present invention as hereinafter contrasted.

In U.S. Pat. No. 4,476,469, titled Means for Assisting in Locating an Object, invented by David R. Lander, a locator means is described for assisting in locating an object (animate or inanimate) comprises a hand-held 'searcher' (50) comprising a short-range signal transmitter powered by an internal cell or battery and having electronic circuitry for generating an address signal when activated by switching means (52) and miniature 'locator' (2) comprising a transponder powered by an internal cell or battery and having electronic circuitry and signal received from the 'search'. The 'searcher' (50) may be provided with circuitry and selective switching means (FIG. 7 or 5A) for selectively addressing, with coded signals, several locators which may be placed with or on respective objects or attached thereto, e.g., by means of a small ring (8). The 'searcher' (50) is preferably torch-like with a handle (56) which may have a lug (58) for attachment of a lanyard (60) whereby the 'searcher' may be tethered to a mounting (62). The transmitter-to-transponder signaling may be by airwaves or vibrations or by electromagnetic waves preferably employing pulse position modulation. Possible forms of such transmission are described, also information as to the electronic circuitry (FIGS. 8 and 9) and constructional details of a miniature locator (16) (FIGS. 3 and 4).

The patented invention is similar to the present invention but differs from the present invention because the patented invention is a device for assisting in locating an object. The patented invention is called Finder's Bleeper's this should be Trademark Searched by you before committing to Finder's Keeper's as a product name. The patented invention comprises a hand held unit with article selection buttons functioning to transmit a code to a second device located with a desired article. The hand held has direction finding capabilities based on a direction transmitted source which functions to cause the remote to emit when the hand held is pointed at it and stop when it is not. When interrogated by the hand held the selected device emits an audio signal. In the present invention the hand held device contains a control panel selector buttons for each multiple sensors/chip it is desired to locate. When a preselected button is depressed, a transmitter sends signal containing preselected code. The signal is received by a receiver in each multiple sensors/chip. The receiver in each multiple sensors/chip reads the code and if a match is obtained the receiver enables an audio tone generator in the multiple sensors/chip to send a tone through an audio speaker. The multiple sensors/chip further, transmits a signal to the hand held device which is received by a second receiver and decoded. The second receiver matches the code with the multiple sensors/chip selected and enables a second audio tone generator to send a second tone through a second speaker. Both tones are controlled to become louder the closer the hand held device is to the desired multiple sensors/chip which provides a direction sensing capability. The multiple sensors/chip has an attachment device permitting attachment to various articles to be found. The hand held device and multiple sensors/chip are powered by a power source.

In U.S. Pat. No. 5,638,050, titled System for Locating an Object, invented by Frank Sacca a system for locating an object is described. The patented invention is a remote control having a transmitter and a receiver. The receiver has circuitry implementing power saving features. The receiver includes circuitry for turning off portions of the circuitry not essential for performing the current task. The receiver additionally only activates the wireless signal receiver portion of the circuitry periodically for short periods of time. The time of activation represents a small fraction of the operational time if the wireless signal receiver portion were to remain activated continuously.

The patented invention differs from the present invention because the patented invention is a remote control having a transmitter and a receiver. The receiver is adapted with circuitry implementing power saving features. The receiver includes circuitry for turning off portions of the circuitry not essential for performing the current task. The present invention comprises two parts; a hand held device and multiple sensors/chips which are applied to objects the user desires to locate. The hand held device contains a control panel selector buttons for each multiple sensors/chip it is desired to locate. When a preselected button is depressed, a transmitter sends signal containing preselected code. The signal is received by a receiver in each multiple sensors/chip. The receiver in each multiple sensors/chip reads the code and if a match is obtained the receiver enables an audio tone generator in the multiple sensors/chip to send a tone through an audio speaker. The multiple sensors/chip further, transmits a signal to the hand held device which is received by a second receiver and decoded. The second receiver matches the code with the multiple sensors/chip selected and enables a second audio tone generator to send a second tone through a second speaker. Both tones are controlled to become louder the closer the hand held device is to the desired multiple sensors/chip. The multiple sensors/chip has an attachment device permitting attachment to various articles to be found. The multiple sensors/chip is powered by a power source.

In U.S. Pat. No. 5,598,143, titled Remote Control Beeper Locator, invented by Jeff D. Wentz, a system is described for changing the function of a television set through a fixedly positioned signal box and a hand held remote beeper and for locating a plurality of beepers if lost including a remote control signal box located at a television set for chasing the functions of the television set; a plurality of hand held beepers operatively coupled to the signal box for allowing the functions of a television set to be remotely changed; an emitter in the signal box for sending out a corresponding electrical signal to each of the beepers; a receiver in each beeper for receiving such a corresponding electrical signal, whereupon beeping noises are produced for locating each beeper.

The patented invention differs from the present invention because the patented invention is a device including a function of locating a remote control. The patented invention functions by transmitting a separate frequency for each remote desired to be located. The remote when the signal is received transmit an audio signal. The present invention is significantly different in that a single frequency is used. A transmitted code functions to enable one of the multiple sensors/chips which emits an audio signal. Further the audio signal on the hand held unit varies in volume with range to the multiple sensors/chip allowing direction finding capabilities to assist in the location of the multiple sensors/chip.

In U.S. Pat. No. 5,508,699, titled Identifier/locator Device for Visually Impaired invented by Hildy S. Silverman, a locator device is described for the visually impaired including a transmitter and a dual sensing system having a receiver with earphones which are attached to opposite sides of a unit worn on the user's head. The sensing system is capable of determining a direction and distance of the signal, and capable of producing first and second audible notifiers in each of the earphones. The notifier produced in each earphone is different and is associated with the direction and distance of the transmitted signal. When the notifier produced in each earphone is the same, the user is directly in front of the desired object to be located.

The patented invention differs from the present invention because the patented invention comprises two parts a transmitter and a receiver. The transmitter is fixed in location and the receiver is located with a user. The transmitter sends a homing signal to the receiver and audio information characterizing the preselected objects. The receiver has a distance calculator. The patented invention transmits energy in the electromagnetic spectrum The present invention is a device which functions to locate preselected items which are remote from a user. The present invention comprises two parts; a hand held device and multiple sensors/chips which are applied to objects the user desires to locate. The hand held device contains a control panel selector buttons for each multiple sensors/chip it is desired to locate. When a preselected button is depressed, a transmitter sends signal containing preselected code. The signal is received by a receiver in each multiple sensors/chip. The receiver in each multiple sensors/chip reads the code and if a match is obtained the receiver enables an audio tone generator in the multiple sensors/chip to send a tone through an audio speaker. The multiple sensors/chip further, transmits a signal to the hand held device which is received by a second receiver and decoded. The second receiver matches the code with the multiple sensors/chip selected and enables a second audio tone generator to send a second tone through a second speaker. Both tones are controlled to become louder the closer the hand held device is to the desired multiple sensors/chip. The multiple sensors/chip has an attachment device permitting attachment to various articles to be found. The hand held device and multiple sensors/chip are powered by a power source.

In U.S. Pat. No. 5,455,560, titled Means for Locating a Remote Control Device, invented by C. Randal Owen, a locating device is described for locating a remote control device which is capable of controlling an electronic device, the electronic device being stationary and the remote control device being capable of controlling the electronic device from a remote location, is disclosed. The locating device comprises a transmitter portion incorporated with the electronic device and a receiver portion which is located within the remote control device. The transmitter portion comprises circuitry for transmitting a signal. The receiver portion comprises a first oscillator circuit which is adapted to oscillate when the transmitted signal is at the design center frequency of the first oscillator circuit. The receiver portion further comprises a second oscillator circuit which is adapted to begin oscillation after the first oscillator circuit begins to oscillate. The signal from the second oscillator circuit is amplified and provided to an audio oscillator circuit. A method of coding the signals is also disclosed.

The patented invention differs from the present invention because the patented invention is a locating device for locating a remote control device which is capable of controlling an electronic device. The patented invention includes a device for emitting sound which is used to locate the remote device. The patented invention includes a decoding portion which functions to permit finding multiple remote devices. In the present invention the hand held device contains control panel selector buttons for each multiple sensors/chip it is desired to locate. When a preselected button is depressed, a transmitter sends signal containing preselected code. The signal is received by a receiver in each multiple sensors/chip. The receiver in each multiple sensors/chip reads the code and if a match is obtained the receiver enables an audio tone generator in the multiple sensors/chip to send a tone through a audio speaker. The multiple sensors/chip further, transmits a signal to the hand held device which is received by a second receiver and decoded. The second receiver matches the code with the multiple sensors/chip selected and enables a second audio tone generator to send a second tone through a second speaker. Both tones are controlled to become louder the closer the hand held device is to the desired multiple sensors/chip. The multiple sensors/chip has an attachment device permitting attachment to various articles to be found.

In U.S. Pat. No. 5,294,915, titled Means for Locating a Remote Control Device, invented by C. Randal Owen, a remote control locating device is disclosed which comprises a transmitter built into and hard wired into the circuitry of a remotely controlled electronic device and a receiver which is built into and hard wired into a remote control device which is capable of controlling the electronic device. The transmitter is adapted to operate on low power and is also adapted to transmit a FM signal upon operation of a switch. The receiver receives the FM signal transmitted from the transmitter and the receiver is also adapted to receive power from a battery contained in and adapted to power the remote control device. The receiver contains an audible signaling device adapted to be actuated upon receipt of the FM signal transmitted from the transmitter and the receiver further contains a timer adapted to deactivate the audible device upon expiration of a predetermined period of time for the purpose of saving battery usage.

The patented invention differs from the present invention because the patented invention is a locating device for locating a remote control device which is capable of controlling an electronic device. The patented invention includes a power saving circuit. The patented invention includes a device for emitting sound which is used to locate the remote device. The patented invention includes a decoding portion which functions to permit finding multiple remote devices. In the present invention the hand held device contains control panel selector buttons for each multiple sensors/chip it is desired to locate. When a preselected button is depressed, a transmitter sends signal containing preselected code. The signal is received by a receiver in each multiple sensors/chip. The receiver in each multiple sensors/chip reads the code and if a match is obtained the receiver enables an audio tone generator in the multiple sensors/chip to send a tone through an audio speaker. The multiple sensors/chip further, transmits a signal to the hand held device which is received by a second receiver and decoded. The second receiver matches the code with the multiple sensors/chip selected and enables a second audio tone generator to send a second tone through a second speakers. Both tones are controlled to become louder the closer the hand held device is to the desired multiple sensors/chip. The multiple sensors/chip has an attachment device permitting attachment to various articles to be found.

In U.S. Pat. No. 4,989,241, titled Memory Dial Telephone Finder, invented by Stanley Chen, a memory dial telephone finder is described which includes a casing integrally made on the mainframe of a microprocessor controlled telephone system, which casing is having two guide posts set at both lateral sides for positioning therebetween of a plurality of telephone number index cards, which index cards are having cuttings for quick finding. A plurality of memory keys are mounted on the mainframe in front of the casing to respectively control the mainframe memory which is having the data of the telephone numbers stored therein. A cover which is pivoted to the casing and controlled by an expansion spring to be in a normal open position is having a raid made at the front inner side for sliding there along of a snapper, and a plurality of locating holes for alternatively positioning of the snapper. A stop plate is pivoted to the casing at the inner front position and pressed by a torsional spring to be in a position constantly retained with the cover. A snapper slidably which is mounted on the front edge of the cover is having a press key, through which the cover is operated to show the selected index card, and the matrix in the mainframe memory of the telephone system is turned on. Upon pressing on the associated number key of the telephone system, the telephone system will automatically execute the dialing process.

The patented invention lacks features similar to the present invention.

In U.S. Pat. No. 4,507,653, titled Electronic Sound Detecting Unit for Locating Missing Articles, invented by Edward B. Bayer a miniature, battery-operated electronic unit is described which is adapted to be attached to a common article such as keys or eyeglasses. The unit is responsive to a plurality of sounds for emitting audible tones to enable a misplaced article to be located. A sound detecting and indicating circuit provides the audible tones upon receipt of a sequence of sounds falling within predetermined frequency, time spacing and amplitude ranges. The correct sequence of sounds is generated by the user by clapping, whistling or making any other loud sounds, and no additional transmitting device is required. Improper sequences of sounds are prevented from producing false activation of the unit. Extremely low power consumption, resulting in part from CMOS technology, allows the unit to remain on continuously for a period of six to nine months using standard camera (button cell) batteries. Special battery-saver circuitry prolongs battery life. The unit can be fabricated using gate array or custom chip technology, which results in extremely small size and low cost of manufacture. A visual indicator (270) allows the user to learn proper operation.

The patented invention differs from the present invention because the patented invention is a miniature, battery-operated electronic unit which is attached to a common article such as keys or eyeglasses. The unit is responsive to a user by clapping, whistling or making any other loud sounds. When the receiver receives an audible sound which matches a preselected list of audible sounds the receiver emits a tone which can be used to find the article. The present invention is significantly different in that both a receiver and a transmitter are used and multiple articles can be located.

Numerous innovations for Item Locator with Attachable Receiver/Transmitter have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a device which functions to locate preselected items which are remote from a user. The present invention comprises two parts; a hand held device and multiple sensors/chips which are applied to objects the user desires to locate. The hand held devices contains a control panel selector buttons for each multiple sensors/chip it is desired to locate. When a preselected button is depressed, a transmitter sends signal containing preselected code. The signal is received by a receiver in each multiple sensors/chip. The receiver in each multiple sensors/chip reads the code and if a match is obtained the receiver enables an audio tone generator in the multiple sensors/chip to send a tone through an audio speaker. The multiple sensors/chip further, transmits a signal to the hand held device which is received by a second receiver and decoded. The second receiver matches the code with the multiple sensors/chip selected and enables a second audio tone generator to send a second tone through a second speaker. Both tones are controlled to become louder the closer the hand held device is to the desired multiple sensors/chip. The multiple sensors/chip has an attachment device permitting attachment to various articles to be found. The hand held device and multiple sensors/chip are powered by a power source.

The types of problems encountered in the prior art are location of objects which are hidden from direct view.

In the prior art, unsuccessful attempts to solve this problem were attempted namely: devices which are built into the object to be found, which lack adaptability to be incorporated into existing objects. However, the problem was solved by the present invention because the present invention can be attached to any object which it desired to find by other than visual means.

Innovations within the prior art are rapidly being exploited as the need for finding lost items increases.

The present invention solved a long felt need a simple device which is adapted to function with existing objects to be found.

The present invention produced unexpected results namely: as an anti theft device for skis, whereupon the owner could separate a pair of skis then electronically find each one.

Accordingly, it is an object of the present invention to provide an item locator with attachable receiver/transmitter.

More particularly, it is an object of the present invention to provide an item locator which outputs a signal proportional to the range to the lost object.

In keeping with these objects, and with others which will become apparent hereinafter, one feature of the present invention resides, briefly stated, in a housing.

In accordance with another feature of the present invention, the housing contains plurality of locator buttons.

Another feature of the present invention is that a plurality of remote members are attachable to objects.

Yet another feature of the present invention is that a locator button, when pressed causes a specific remote member to be activated.

Still another feature of the present invention is that an ON/OFF switch controls power application from a battery to a microprocessor.

Yet still another feature of the present invention is that a volume control is electrically connected to a speaker.

Still yet another feature of the present invention is that a speaker is electrically connected to a microprocessor such that as the housing is brought closer to the remote member the volume increases.

Another feature of the present invention is that LCD lights are electrically connected to the microprocessor such that as the housing is moved closer to the remote member the brightness increases.

Yet another feature of the present invention is that a receiver/transmitter is in communication with a remote member.

Still another feature of the present invention is that a vibrator is electrically connected to the microprocessor such that as the housing is moved closer to the remote member the vibration rate increases.

Yet still another feature of the present invention is that blinking LCD lights are electrically connected to the microprocessor such that as the housing is moved closer to the remote member the blinking rate increases.

The novel features which are considered characteristic for the invention are set forth in the appended claims. The invention itself however, both as to its construction and its method of operation, together with additional objects and advantages thereof will be best understood from the following description of the specific embodiments when read and understood in connection with the accompanying drawings.

List of Reference Numerals Utilized in the Drawings

10—item locator with attachable receiver/transmitter (10)
12—housing (12)
12F—housing front (12F)
12B—housing back (12B)
12BA—housing back compartment cover (12BA)
14A—keys locator button (14A)
14B—glasses locator button (14B)
14C—telephone locator button (14C)
14CA—telephone locator button remote member (14CA)
14CAA—telephone locator button remote member icon (14CAA)
14CAB—telephone locator button remote member battery (14CAB)
14CAC—telephone locator button remote member microchip (14CAC)
14CAD—telephone locator button remote member receiver/transmitter (14CAD)
14CAE—telephone locator button remote member speaker (14CAE)
14D—watch locator button (14D)
14DA—watch locator button remote member (not shown)
14E—money locator button (14E)
14EA—money locator button remote member (not shown)
14F—address book locator button (14F)
14FA—address book locator button remote member (not shown)
14G—remote control locator button (14G)
14GA—remote control locator button remote member (not shown)
14H—purse/wallet locator button (14H)
14HA—purse/wallet locator button remote member (not shown)
16—ON/OFF switch (16)
18—volume control (18)
20—LCD lights (20)
22—microchip (22)
24—receiver/transmitter (24)
26—battery (26)
28—speaker (28)
30—vibrator (30)
32—phone (32)

DESCRIPTION OF THE PREFERRED EMBODIMENT

Figure 1A:
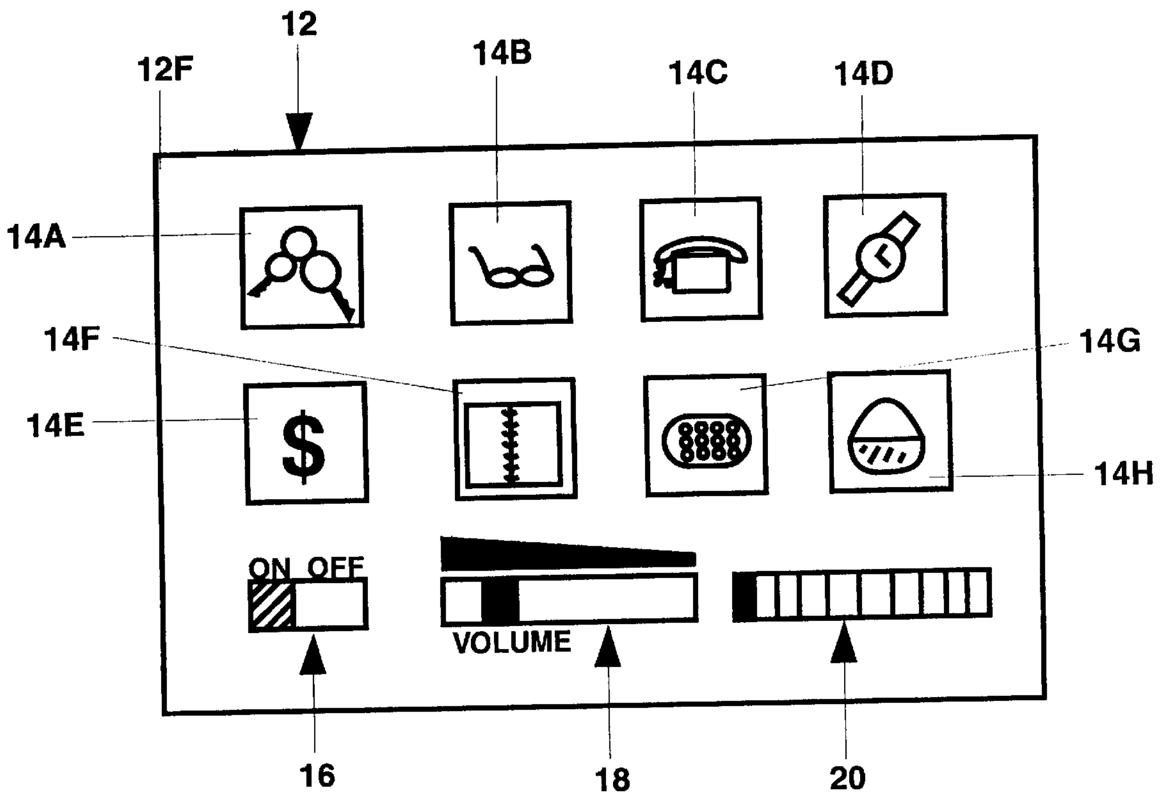
FIG. 1A is a front view of an item locator with attachable receiver/transmitter.
Figure 1B:
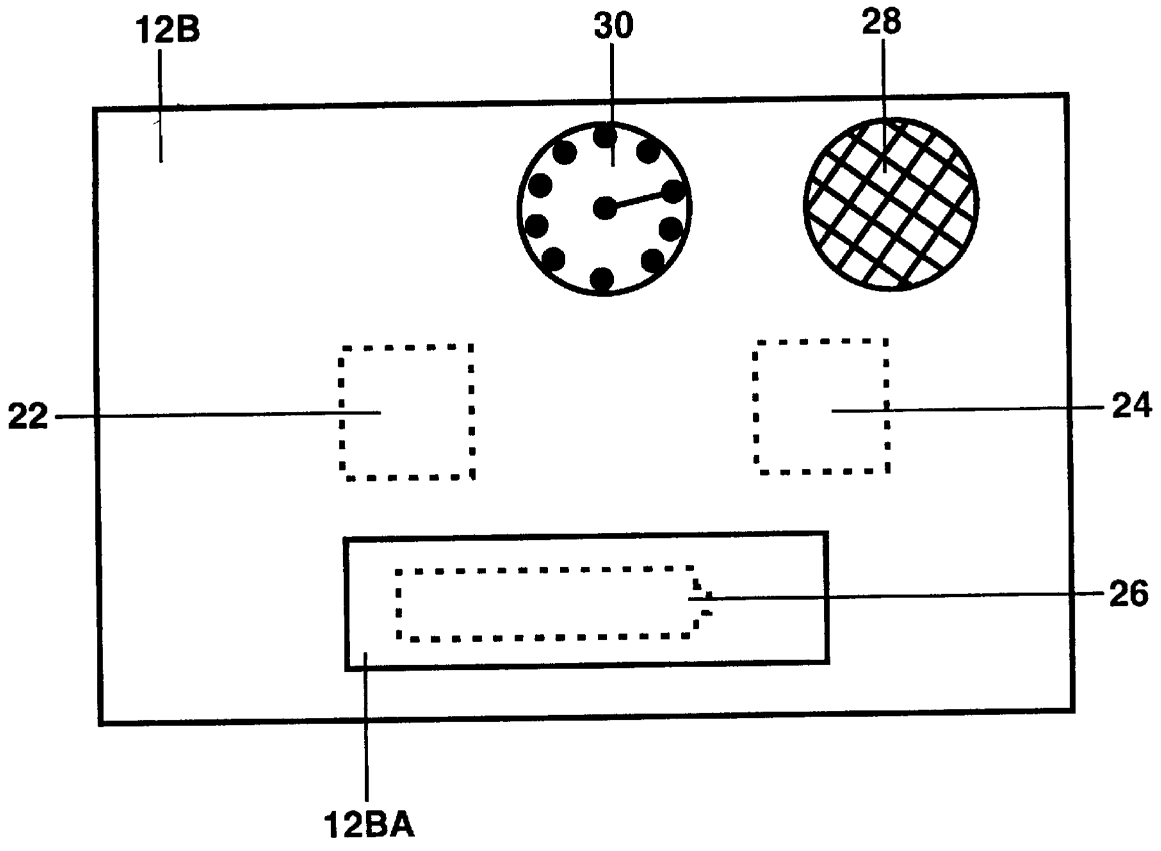
FIG. 1B is a back view of an item locator with attachable receiver/transmitter.

Firstly, referring to FIG. 1A and FIG. 1B which are a front view of an item locator with attachable receiver/transmitter (10) and a back view of an item locator with attachable receiver/transmitter (10) respectively. The item locator with attachable receiver/transmitter (10) comprises a housing (12) having a housing front (12F).

The item locator with attachable receiver/transmitter (10) further comprises at least two locator buttons each corresponding to a different item. The at least two locator buttons are positioned on the housing front (12F). The at least two locator buttons are selected from a group consisting of keys locator button (14A), glasses locator button (14B), telephone locator button (14C), watch locator button (14D), money locator button (14E), address book locator button (14F), remote control locator button (14G), and purse/wallet locator button (14H). The locator buttons are large, each having a large icon of the item positioned thereon which facilitates location by visually impaired persons.

A microchip (22) is positioned within the housing (12) and electrically connected to the at least two locator buttons. The microchip (22) is further electrically connected to one distal end of a single pole single throw ON/OFF switch (16) which is positioned within the housing (12). The opposite distal end of the ON/OFF switch (16) is electrically connected to one distal end of a battery (26). The battery (26) is positioned within the housing (12). The ON/OFF switch (16) functions to control electrical energy from the battery (26).

A receiver/transmitter (24) is positioned within the housing (12) and electrically connected to the microchip (22). A speaker (28) is further positioned within the housing (12) and electrically connected to the microchip (22).

At least two locator button remote members each corresponding to the at least two locator buttons are removably attached to one of the different items. Each of the at least two locator button remote members comprise a locator button remote member battery. The locator button remote member battery is electrically connected to a locator button remote member microchip. The locator button remote member microchip is electrically connected to a locator button remote member receiver/transmitter which is electrically connected to a locator button remote member speaker. Each of locator button remote member receiver/transmitters operate on a different radio frequency corresponding to a frequency generated by the receiver/transmitter and relating to the locator button corresponding to the different item.

Figure 3:
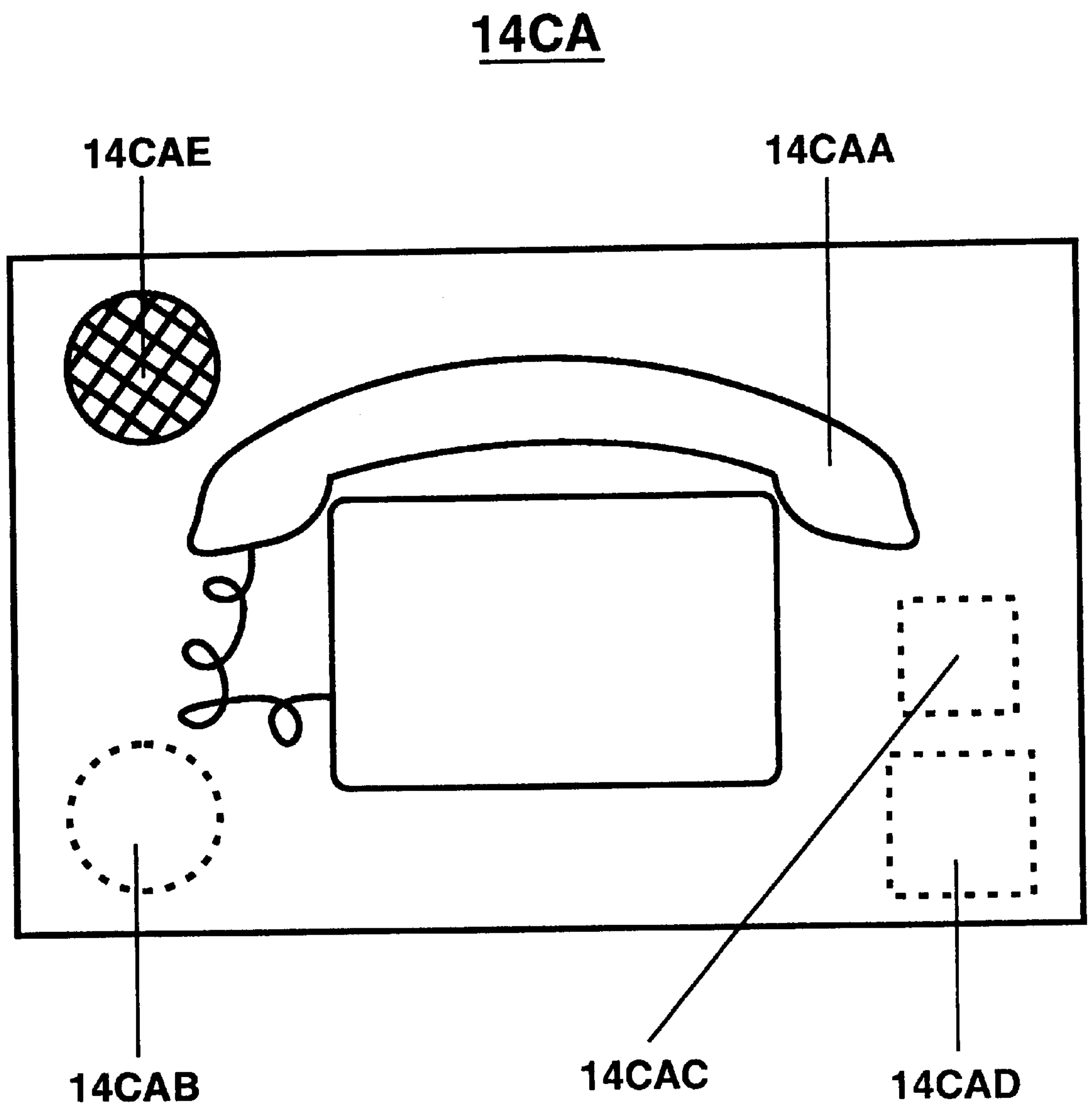
FIG. 3 is a front view of a telephone locator button remote member.

The at least two locator button remote members are selected from a group consisting of telephone locator button remote member (14CA), as shown in FIG. 3, watch locator button remote member (not shown), money locator button remote member (not shown), address book locator button remote member (not shown), remote control locator button remote member (not shown), and purse/wallet locator button remote member (not shown).

When a user activates one of the at least two locator buttons, an electrically impulse is transmitted to the microchip (22) which sends an electronic signal to the receiver/transmitter (24) broadcasting a radio signal therefrom, The corresponding locator button remote member receiver/transmitter of the locator button remote member receives the radio signal and sends an electrical signal to the locator button remote member microchip which sends an electronic signal to the locator button remote member speaker which emanates sound therefrom. Concurrently, the locator button remote member microchip sends an electronic signal to the locator button remote member receiver/transmitter which broadcasts a radio signal to the receiver/transmitter (24) which sends an electronic signal to the microchip (22) which sends an electronic signal to the speaker (28) which emanates sounds therefrom. The strength of the sound emanating from the speaker (28) corresponds to a distance the housing (12) is from the locator button remote member. The closer the distance, the louder the sound which emanates from the speaker (28). A volume control (18) is electrically connected between the microchip (22) and the speaker (28).

A vibrator (30) is electrically connected to the microchip (22). When the user activates one of the at least two locator buttons, an electrically impulse is transmitted to the microchip (22) which sends an electronic signal to the receiver/transmitter (24) broadcasting a radio signal therefrom. The corresponding locator button remote member receiver/transmitter of the locator button remote member receives the radio signal and sends an electrical signal to the locator button remote member microchip which sends an electronic signal to the locator button remote member speaker which emanates sound therefrom. Concurrently, the locator button remote member microchip sends an electronic signal to the locator button remote member receiver/transmitter which broadcasts a radio signal to the receiver/transmitter (24) which sends an electronic signal to the microchip (22) which sends an electronic signal to the vibrator (30) which emanates vibrations therefrom. The strength of the vibration emanating from the vibrator (30) corresponds to a distance the housing (12) is from the locator button remote member. The closer the distance, the stronger the vibration which emanates from the vibrator (30).

A LCD lights (20) is electrically connected to the microchip (22), when the user activates one of the at least two locator buttons, an electrically impulse is transmitted to the microchip (22) which sends an electronic signal to the receiver/transmitter (24) broadcasting a radio signal therefrom, the corresponding locator button remote member receiver/transmitter of the locator button remote member receives the radio signal and sends an electrical signal to the locator button remote member microchip which sends an electronic signal to the locator button remote member speaker which emanates sound therefrom. Concurrently, the locator button remote member microchip sends an electronic signal to the locator button remote member receiver/transmitter which broadcasts a radio signal to the receiver/transmitter (24) which sends an electronic signal to the microchip (22) which sends an electronic signal to the LCD lights (20) which emanates light therefrom, the number of illuminated lights emanating from the LCD lights (20) corresponds to a distance the housing (12) is from the locator button remote member, the closer the distance, the more lights illuminated.

Figure 2:
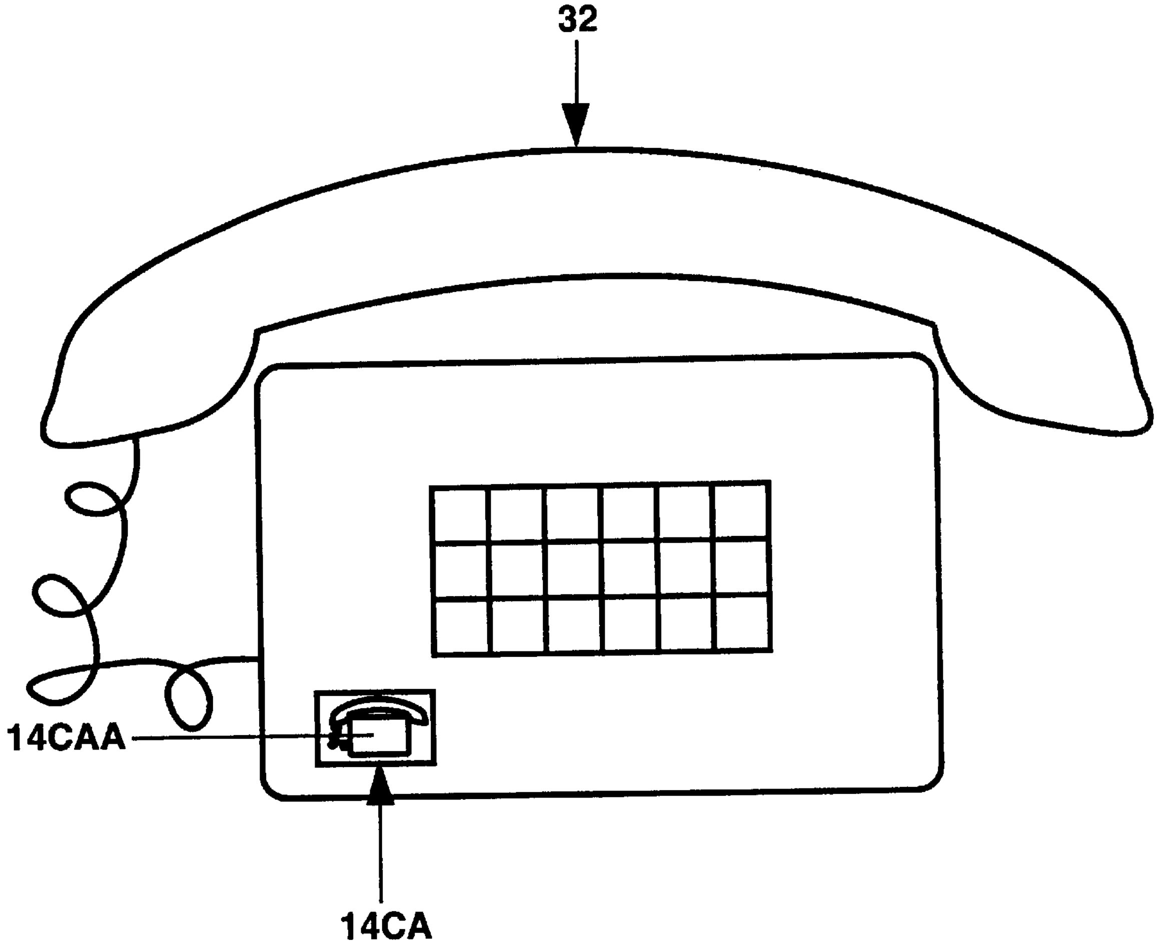
FIG. 2 is a front view of a phone.

Thirdly, referring to FIG. 2 which is a front view of a phone (32), which comprises a telephone locator button remote member (14CA). The telephone locator button remote member (14CA) comprises a telephone locator button remote member icon (14CAA) positioned thereon.

Lastly, referring to FIG. 3 which is a front view of a telephone locator button remote member (14CA). The telephone locator button remote member (14CA) comprises a telephone locator button remote member icon (14CAA) positioned thereon. The telephone locator button remote member (14CA), is removably attachable to a phone (32), and comprises a telephone locator button remote member battery (14CAB) which is electrically connected to a telephone locator button remote member microchip (14CAC). The telephone locator button remote member microchip (14CAC) is further electrically connected to a telephone locator button remote member receiver/transmitter (14CAD) and a telephone locator button remote member speaker (14CAE). The telephone locator button remote member speaker (14CAE) is further electrically connected to the telephone locator button remote member microchip (14CAC).

When a user activates one of the telephone locator button (14C), an electrically impulse is transmitted to the microchip (22) which sends an electronic signal to the receiver/transmitter (24), all as shown in FIG. 1, broadcasting a radio signal therefrom. The telephone locator button remote member receiver/transmitter (14CAD) of the telephone locator button remote member (14CA) receives the radio signal and sends an electrical signal to the telephone locator button remote member microchip (14CAC) which sends an electronic signal to the telephone locator button remote member speaker (14CAE) which emanates sound therefrom. Concurrently, the telephone locator button remote member microchip (14CAC) sends an electronic signal to the telephone locator button remote member receiver/transmitter (14CAD) which broadcasts a radio signal to the receiver/transmitter (24). The receiver/transmitter (24) then sends an electronic signal to an indicating device. The indicating device provides an output therefrom corresponding to a distance the housing (12) is from the telephone locator button remote member (14CA). The indicating device is selected from a group consisting of LCD lights (20), speaker (28), and vibrator (30).

It will be understood that each of the elements described above, or two or more together, may also find a useful application in other types of constructions differing from the type described above.

While the invention has been illustrated and described as embodied in an Item Locator with Attachable Receiver/Transmitter, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An item locator with attachable receiver/transmitter (10) comprising:

A) a housing (12) which comprises a housing front (12F) and a housing back (12B);

B) at least two locator buttons each corresponding to a different item, the at least two locator buttons are positioned on the housing front (12F);

C) a microchip (22) positioned within the housing (12) and electrically connected to the at least two locator buttons;

D) an ON/OFF switch (16) positioned within the housing (12) and electrically connected to the microchip (22);

E) a battery (26) positioned within the housing (12) and electrically connected to the ON/OFF switch (16);

F) a receiver/transmitter (24) positioned within the housing (12) and electrically connected to the microchip (22);

G) a speaker (28) positioned within the housing (12) and electrically connected to the microchip (22);

H) at least two locator button remote members each corresponding to the at least two locator buttons, each of the at least two locator button remote members are removably attached to one of the different items, each of the at least two locator button remote members comprise a locator button remote member battery electrically connected to a locator button remote member microchip which is electrically connected to a locator button remote member receiver/transmitter which is electrically connected to a locator button remote member speaker, each of locator button remote member receiver/transmitters operate on a different radio frequency corresponding to a frequency generated by the receiver/transmitter and relating to the locator button corresponding to the different item, when a user activates one of the at least two locator buttons, an electrically impulse is transmitted to the microchip (22) which sends an electronic signal to the receiver/transmitter (24) broadcasting a radio signal therefrom, the corresponding locator button remote member receiver/transmitter of the locator button remote member receives the radio signal and sends an electrical signal to the locator button remote member microchip which sends an electronic signal to the locator button remote member speaker which emanates sound therefrom, concurrently the locator button remote member microchip sends an electronic signal to the locator button remote member receiver/transmitter which broadcasts a radio signal to the receiver/transmitter (24) which sends an electronic signal to the microchip (22) which sends an electronic signal to the speaker (28) which emanates sounds therefrom, the strength of the sound emanating from the speaker (28) corresponds to a distance the housing (12) is from the locator button remote member, the closer the distance, the louder the sound which emanates from the speaker (28);

I) a vibrator (30) electrically connected to the microchip (22), when the user activates one of the at least two locator buttons, an electrically impulse is transmitted to the microchip (22) which sends an electronic signal to the receiver/transmitter (24) broadcasting a radio signal therefrom, the corresponding locator button remote member receiver/transmitter of the locator button remote member receives the radio signal and sends an electrical signal to the locator button remote member microchip which sends an electronic signal to the locator button remote member speaker which emanates sound therefrom, concurrently, the locator button remote member microchip sends an electronic signal to the locator button remote member receiver/transmitter which broadcasts a radio signal to the receiver/transmitter (24) which sends an electronic signal to the microchip (22) which sends an electronic signal to the vibrator (30) which emanates vibrations therefrom, the strength of the vibration emanating from the vibrator (30) corresponds to a distance the housing (12) is from the locator button remote member, the closer the distance, the stronger the vibration which emanates from the vibrator (30);

J) a volume control (18) electrically connected between the microchip (22) and the speaker (28); and K) LCD lights (20) electrically connected to the microchip (22), when the user activates one of the at least two locator buttons, an electrically impulse is transmitted to the microchip (22) which sends an electronic signal to the receiver/transmitter (24) broadcasting a radio signal therefrom, the corresponding locator button remote member receiver/transmitter of the locator button remote member receives the radio signal and sends an electrical signal to the locator button remote member microchip which sends an electronic signal to the locator button remote member speaker which emanates sound therefrom, concurrently, the locator button remote member microchip sends an electronic signal to the locator button remote member receiver/transmitter which broadcasts a radio signal to the receiver/transmitter (24) which sends an electronic signal to the microchip (22) which sends an electronic signal to the LCD lights (20) which emanates light therefrom, the number of illuminated lights emanating from the LCD lights (20) corresponds to a distance the housing (12) is from the locator button remote member, the closer the distance, the more lights illuminated.

2. The item locator with attachable receiver/transmitter (10) as described in claim 1, wherein the housing back (12B) further comprises a removable housing back compartment cover (12BA) which covers a compartment which houses the battery (26).

3. The item locator with attachable receiver/transmitter (10) as described in claim 1, wherein the at least two locator buttons are selected from a group consisting of keys locator button (14A), glasses locator button (14B), telephone locator button (14C), watch locator button (14D), money locator button (14E), address book locator button (14F), remote control locator button (14G), and purse/wallet locator button (14H).

4. The item locator with attachable receiver/transmitter (10) as described in claim 3, wherein the locator buttons are large each having a large icon of the item positioned thereon which facilitates location by visually impaired persons.

5. The item locator with attachable receiver/transmitter (10) as described in claim 1, wherein the at least two locator button remote members are selected from a group consisting of telephone locator button remote member (14CA), watch locator button remote member, money locator button remote member, address book locator button remote member, remote control locator button remote member, and purse/wallet locator button remote member.

6. The item locator with attachable receiver/transmitter (10) as described in claim 5, wherein the telephone locator button remote member (14CA) comprises a telephone locator button remote member icon (14CAA) positioned thereon.

7. The item locator with attachable receiver/transmitter (10) as described in claim 6, wherein the telephone locator button remote member (14CA), removably attachable to a phone (32), comprises a telephone locator button remote member battery (14CAB) electrically connected to a telephone locator button remote member microchip (14CAC) which is electrically connected to a telephone locator button remote member receiver/transmitter (14CAD) and a telephone locator button remote member speaker (14CAE) electrically connected to the telephone locator button remote member microchip (14CAC).

* * * * *